United States Patent [19]

Bruneau

[11] 4,152,825
[45] May 8, 1979

[54] METHOD OF MAKING A FLAT BATTERY

[75] Inventor: Louis O. Bruneau, Weston, Mass.

[73] Assignee: Polaroid Corporation, Cambridge, Mass.

[21] Appl. No.: 478,106

[22] Filed: Jun. 10, 1974

[51] Int. Cl.² .................................................. H01M 6/00
[52] U.S. Cl. .................................... 29/623.2; 429/152; 429/162
[58] Field of Search ................ 136/175, 176, 111; 29/623.1–623.5; 429/152–162

[56] References Cited

U.S. PATENT DOCUMENTS

| 2,870,235 | 1/1959 | Soltis | 136/175 X |
| 3,563,805 | 2/1971 | Deierhoi, Jr. | 136/111 |
| 3,617,387 | 11/1971 | Grulke | 136/111 |
| 3,723,181 | 3/1973 | Oakley | 136/111 X |
| 3,740,270 | 6/1973 | Bilhorn | 136/175 X |
| 3,775,188 | 11/1973 | Oltman et al. | 136/175 |
| 3,775,190 | 11/1973 | Oakley | 136/175 |

Primary Examiner—Charles F. LeFevour
Attorney, Agent, or Firm—John W. Ericson; Gerald L. Smith; Sheldon W. Rothstein

[57] ABSTRACT

A flat battery structure and method of fabricating it which is characterized in the utilization of an electrically insulative carrier web base in combination with discretely positioned electrically conductive components of the battery pile structure. Through the select dimensioning of the discrete components of the battery, in conjunction with the utilization of insulative web carriers, improved reliability of battery operation is realized.

17 Claims, 6 Drawing Figures

METHOD OF MAKING A FLAT BATTERY

BACKGROUND

The development of thin, compact and highly automated cameras as described, for instance, in U.S. Pat. Nos. 3,750,551; 3,744,385; 3,731,608; and 3,714,879 has been seen to have generated a concomitant need for a flat and compact battery source of power capable of operating a variety of electrical control instrumentalities having somewhat specialized power requirements. For instance, the battery must have a relatively high current output capacity for powering a motor driven film processing and reflex optics cocking assembly as well as electrically automated shutters incorporating electromagnetic drive devices and the like. Inasmuch as these instrumentalities are regulated by logic circuitry, requisite voltage levels must be sustained by the batteries during the noted current drains. A flat multicellular pile structure is particularly suited for providing a requisite low internal impedance battery. As described in U.S. Pat. No. 3,543,662, preferably, the thin battery is mounted within a film cassette assemblage and takes the shape of one film unit thereof. In consequence of this combined battery power supply-film supply arrangement, the compactness and thinness of a resultant foldable camera may be optimized.

For practical utilization in combination with a photographic film product, for instance, to form the composite cassette assembly described above, the thin batteries must not only be amenable to economic high volume production techniques, but also must exhibit a very high reliability. Such reliability is mandatory inasmuch as the batteries are packaged as an integral part of the film cassette assemblage and any dysfunctions on the part of the battery component thereof well may result in the wasting of the entire film cassette or pack.

To achieve requisite low unit costs in producing such thin batteries, the industry heretofore has looked to techniques wherein wide, continuous and multizoned webs of the sheet type components of the batteries or piles are manipulated along a production line to simultaneously form a plurality of cells and composites thereof. Following final formation of the electrochemically active multicell structures, the wide web formations thereof are slit and sheared as a later or last step in fabrication to form discrete battery units. These discrete units then are packaged as a component of film cassette assemblages whereupon they are forwarded to retail distribution channels.

When such multi-zone, wide web type high volume production battery assembly techniques are utilized, it is necessary that electrically conductive web type components of the battery pile structures serve as web carriers within the assembly system. For instance, electrically conductive materials preferably are utilized as electrode supports and as intercell connectors. When employed within a multi-zone wide web production scheme, these web-type conductive materials necessarily are combined with electrochemically active materials, and consequently, voltage build-up phenomena along the production line. Such electrochemical activity may have the effect of derogating from battery performance. Further, the battery structures necessarily evolved from this form of wide web assembly require a shearing of superposed conductive-insulative layers to evolve discrete battery structures. Utilization of such shearing procedures in forming discrete ones of the laminate battery structures may lead to product rejection due to edge shorting occasioned between contiguous electrically conductive layers.

SUMMARY OF THE INVENTION

The present invention is addressed to a flat battery structure of improved reliability and to a method providing for its economic production. Reliability is gained through utilization of a laminar structure wherein a flat battery or pile is assembled upon a thin, sheet-type electrically insulative carrier. Components of the battery which are structured in sheet form are introduced onto the insulative carrier supported assembly line as discrete elements commencing with as well as concluding with electrode collector assemblies.

The continuous thin, sheet-type electrically insulative carrier is formed having a width substantially corresponding with the width of a completed battery or pile structure and serves to carry a continuously built-up pile structure until the conclusion of the multicell build-up, whereupon only the carrier is sheared to provide discrete battery units. Inasmuch as the carrier remains insulative throughout the pile build-up, no voltage build-up phenomena or the like are encountered during production.

Another feature of the method of construction according to the invention resides in the laminar pile build-up of components of each battery utilizing, with the exception of electrolyte materials, discrete components. These components include intercell connectors, electrode assemblies and separators and, through a unique selection of component dimensions, no electrically conductive layers or components are exposed to shearing or slitting operations. As a consequence, the reliability of the battery structure is considerably enhanced due to an elimination of edge shorting phenomena and the like.

In one aspect of the invention, openings may be formed at a predetermined pitch within the insulative carrier element of the battery structures. These openings serve to provide an exposed terminal surface of an initially positioned electrode assembly. Similarly, to form a terminal of opposite polarity adjacent the above-noted terminal surface, the final collector assembly is selected having a width greater than that of the insulative carrier sheet. When this collector assembly is wrapped about the discrete pile structure, it is automatically insulated from contact with the oppositely disposed electrode carrier assembly and, due to the unique selection of component sizes of the elements of the battery, is fully protected from edge shorting phenomena and the like.

Another object and feature of the invention is to provide a flat battery structure comprising means defining at least one flat cell thereof which includes two outwardly positioned electrodes, operably disposed in combination with electrolyte and separator structures. The battery arrangement additionally includes two flat sheet collector elements electrically coupled with the electrodes and arranged to structurally support them. The structure further includes an electrically insulative sheet mounted adjacent a select one of the collector elements which has an access opening framed therein to expose a portion of the surface of a select collector so as to define a terminal of the battery.

As another object and feature, the invention provides a method for constructing flat battery units which comprises the steps of providing a continuous carrier sheet of electrically insulative material; fixedly placing in selectively spaced alignment or pitch on this continuous carrier a predetermined sequence of electrolyte, anode and cathode materials in combination with discrete current collectors, spacers or separators and intercell connectors to form discrete electrically coupled flat cell assemblies and, cutting the continuous carrier sheet between the discretely formed cell assemblies to provide discrete battery units.

Other objects of the invention will in part be obvious and will in part appear hereinafter.

The invention accordingly comprises the method and product possessing the construction, combination of elements and steps and arrangement of parts which are exemplified in the following detailed disclosure.

For a fuller understanding of the nature and objects of the invention, reference should be had to the following detailed description taken in conjunction with the accompanying drawings.

DETAILED DESCRIPTION

Figure 1:
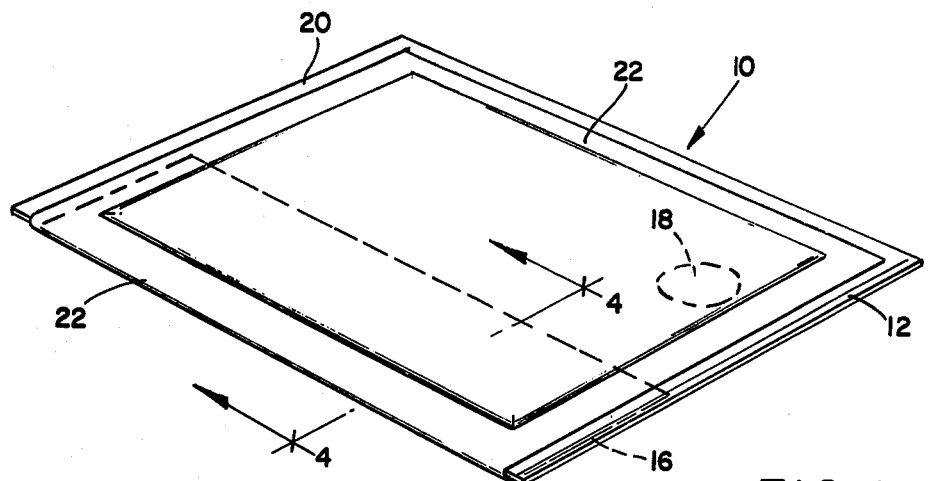
FIG. 1 is a perspective view of a flat primary battery structure according to the invention as it exists prior to packaging.

A multicell flat battery structure is presented generally at 10 in FIG. 1 as it would appear in an electrochemically active state following component build-up in accordance with the method of the instant invention. Certain of the features of the invention will appear from an examination of this perspective view. Note, for instance, the presence of an electrically insulative sheet 12 located at the bottom of the pile structure. The length of insulative sheet 12 as well as its widthwise dimension are selected such that it extends slightly beyond the peripheries of the electrically active laminar components of battery 10. The upwardly facing surface of battery 10 is present as the outer metal surface of an anode electrode current collector assembly 14. The electrode current collector assembly 14 is folded about one side of battery structure 10 to present a downwardly facing metallic surface portion as at 16 which is utilized to provide a terminal defining surface for the battery. An opening shown in dashed fashion at 18 and formed in insulative sheet 12 provides access to the downwardly facing metal surface of a cathode electrode collector assembly (shown in FIG. 4) which is attached to the upward facing surface of sheet 12. With the arrangement, cathode and anode terminals may be provided in convenient adjacency on one flat surface of the battery structure 10. Also revealed in FIG. 1 are the peripheral edges of electrically insulative separator elements 20. The slightly depressed peripheral portion 22 of the assembly is occasioned from peripheral sealing procedures provided in the course of assembly of the structure 10. This depression necessarily becomes more exaggerated in the sectional views of the battery.

Figure 4:
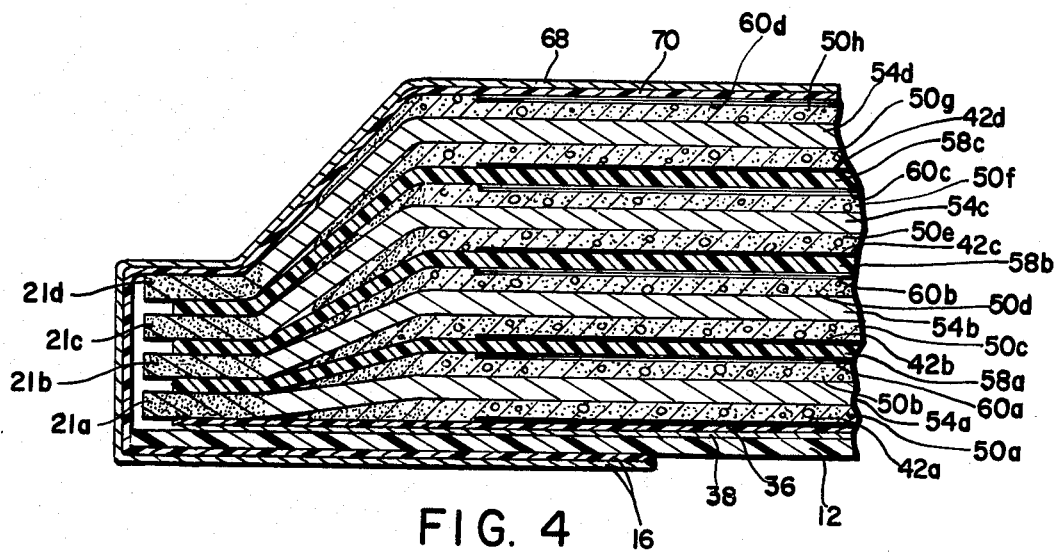
FIG. 4 is a sectional view of a battery structure according to the invention taken through the plane 4—4 of FIG. 1.
Figure 2:
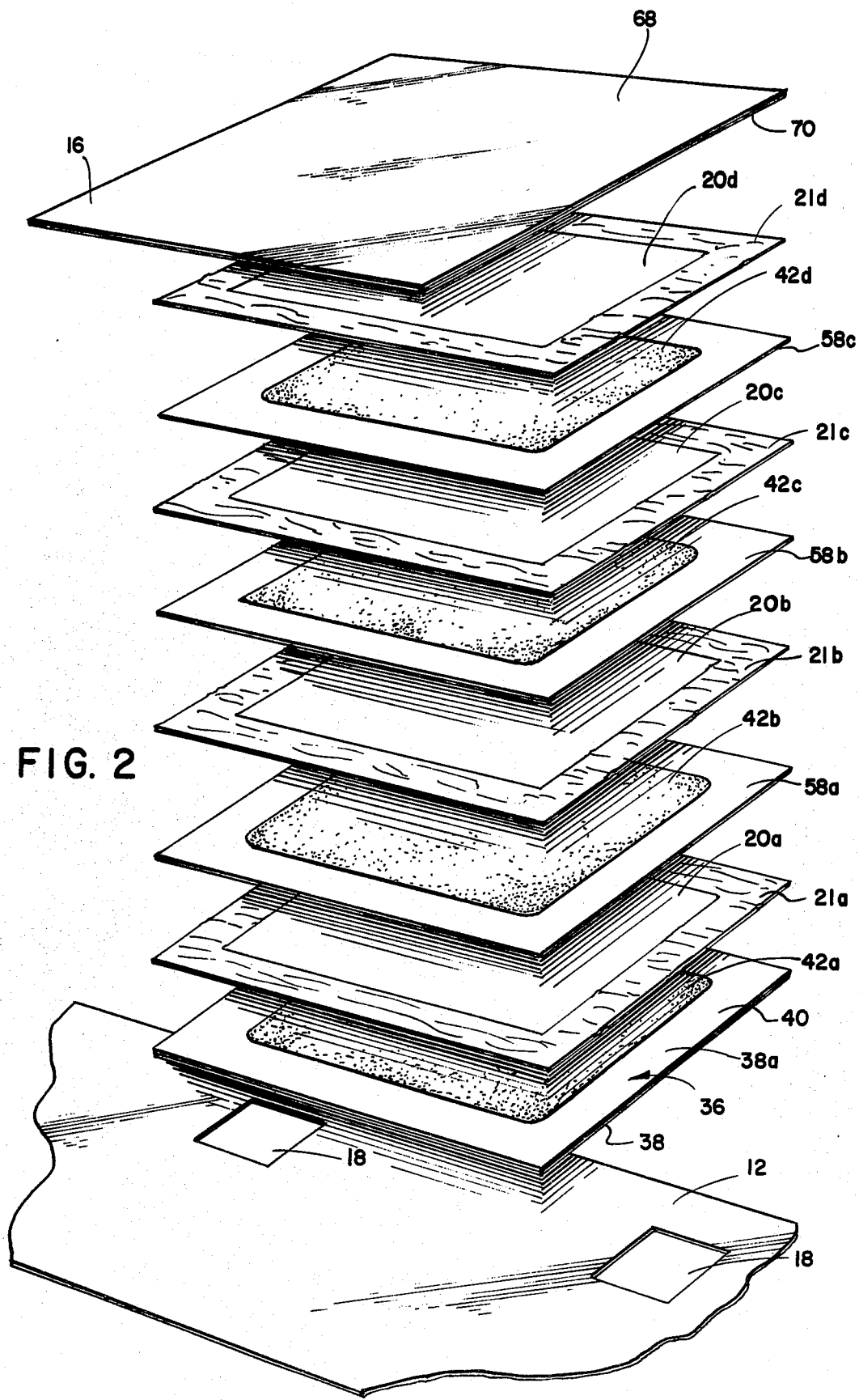
FIG. 2 is an exploded perspective representation of the components of a battery structure according to the invention revealing the relative orientation of sheet type components thereof.
Figure 3:
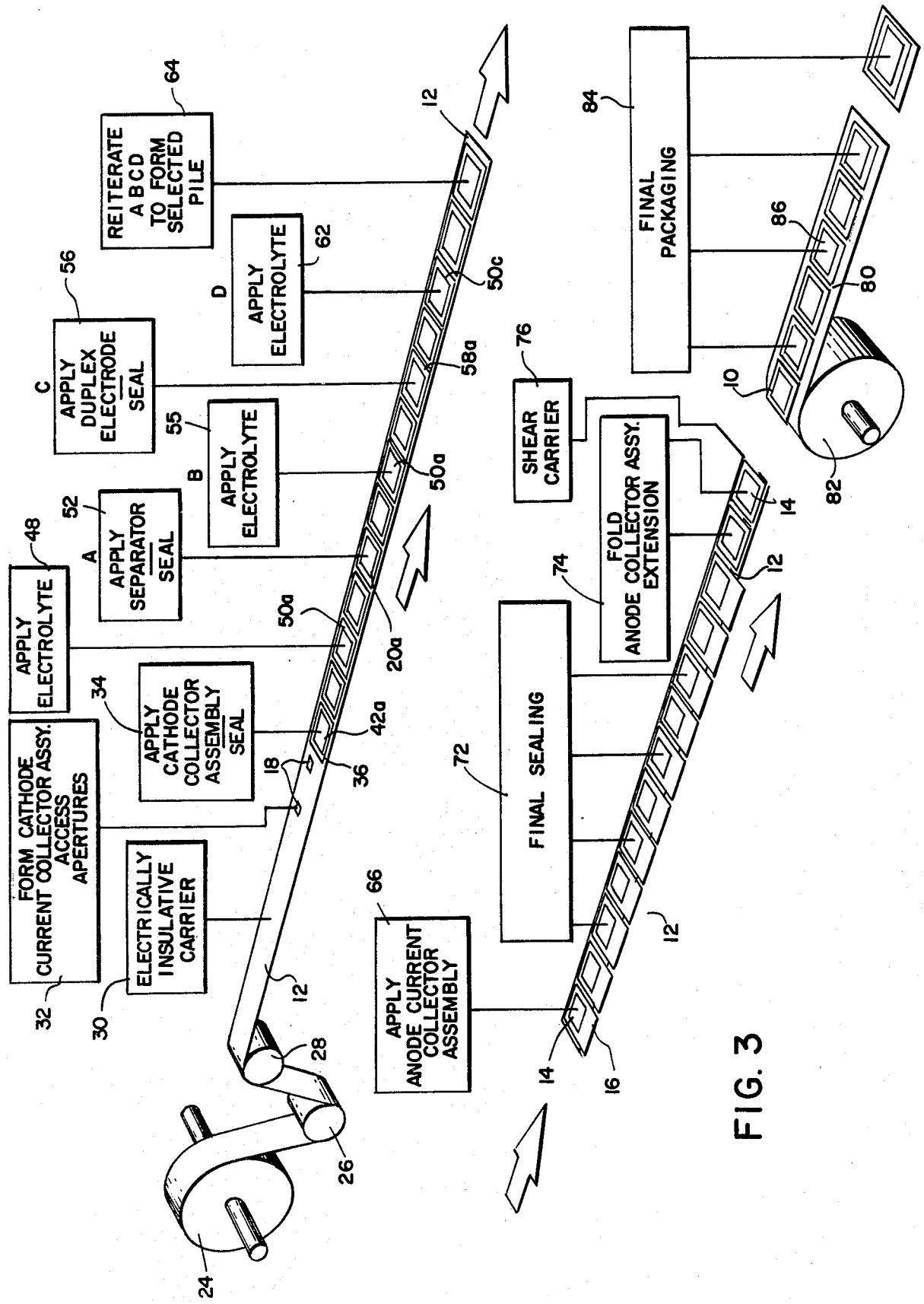
FIG. 3 is a schematic diagram showing, in block fashion, the functions of fabricating stations along an assembly line for producing the battery structure of the invention.

Looking now to FIGS. 2, 3, and 4, the structure of battery 10 is revealed in more detail and the method of the invention for fabricating it utilizing appropriately high volume production techniques is shown. The production technique of the invention is typified in the utilization of an electrically insulative sheet or web type carrier ultimately serving as the above-described sheet 12. Sheet 12 may be drawn from a suitable roll type supply 24 and introduced to a fabricating industrial line through appropriate web drives (not shown) including tension adjusting rolls as at 26 and 28. Web 12 preferably is introduced having a width selected to achieve the geometry described in connection with battery 10 of FIG. 1. Accordingly, its width is selected as being slightly greater than the electrically active components of the battery structure or at least as wide as separator components 20. Materials selected for the web, in addition to being electrically insulative, should be chemically inert and are preferably a plastic material, for instance, a film of an organic polymer which is capable of being heat sealed. Suitable materials are "Mylar", a product of E. I. DuPont de Nemours and Co. or "Estar", a product of Eastman Kodak, Inc. which is a film of polyethylene terephthalate or an unfilled polyvinyl chloride or the like. For photographic applications as described in the above-referenced U.S. Pat. No. 3,543,662, sheet or web 12 may be coated with a substance opaque to actinic radiation incident thereon to aid in maintaining the lighttight integrity of any film container within which the batteries are incorporated. A black "Mexican lacquer" coating is found to be suitable for this purpose.

Web or carrier 12 is manuvered through the production or assembly area with an intermittent motion in accordance with the spacing of individual multicell battery or pile assemblies which are made thereon. The provision of the insulative carrier 12 is revealed by function or station block 30 in FIG. 3, while the initial pitch or spacing between the battery units on the carrier web is established by the formation of access apertures 18 as revealed at station or function block 32. By photodetecting an edge of these apertures 18, suitable spacing and registration controls may be provided throughout all of the assembly stations of the production line. While openings 18 may take a variety of shapes, a convenient arrangement is an opening having a rectangular periphery formed toward one side of web 12 in a position such that a terminal defining surface is in position for appropriate contact with the instrumentalities within which the battery is utilized as a power source.

As revealed at station function block 34 in FIG. 3, the component build-up upon web 12 is commenced by positioning a discrete cathode current collector assembly 36 in appropriate registry over access opening 18. Assembly 36 is a discrete laminar structure including a metallic sheet or foil current collector 38 (FIG. 4), preferably an annealed tin coated steel or an aluminum or lead sheet material on the order of less than 10 mils in thickness, which is laminated to a polymeric current collector 40. Collector 40, in turn, preferably is a sheet of electrically conductive carbon-impregnated vinyl film sold under the trade designation "Condulon" having a thickness in the order of about 7 mils and configured having the same relative external or peripheral dimensions as metal surface 38. Predeposited over film surface 40 is a now dry active positive material 42, i.e., a cathodic paste deposition. Cathode 42 is positioned inwardly from the periphery of collector 40 to provide clear surfaces for subsequent sealing procedures and, for providing a Le Clanche electrochemical system, may be present as a mixture of manganese dioxide (depolarizer) and electrically conductive carbon dispersed in a polymeric binder. Of course, the battery structure may be designed to utilize any of a variety of known positive electrode materials such as other inorganic metal oxides, for instance, lead oxide, nickel oxyhydroxide, mercuric oxide, and silver oxide, inorganic metal halides such as silver chloride and lead chloride, and organic materials capable of being reduced such as dinitrobenzene and azodicarbonamide compounds.

When the preformed laminar collector assembly 36 is positioned as by "pick-and-place" technique common in the art, portions of the periphery of web 12 will extend beyond the widthwise periphery of the assembly to provide a geometry facilitating the insulation thereof. The peripheral area of assembly 36 is heat sealed to web 12 following its placement. As revealed at station function block 48 in FIG. 3, web 12 is driven to carry the subassembly including current collector assembly 36 to a position where electrolyte is applied coextensive the facing surface of cathode material 42. Represented in FIG. 4 at 50a, electrolyte 58 ordinarily will comprise a conventional aqueous solution of ammonium chloride/zinc chloride about 4:1 dispersed in a polymeric binder such as hydroxyethyl cellulose, etc., for example on the order of about five percent (5%) or more. In addition, a small quantity of mercuric chloride may be present in the electrolyte as a corrosion inhibitor. Preferably, the electrolyte is deposited over cathode 42 utilizing positive displacement techniques as opposed to doctoring, silk screening and the like.

As revealed at function block 52, the next station in the assembly procedure applies a discrete electrically insulative separator element 28. As is more clearly illustrated in FIG. 4 and as has been described in connection with the separator elements described generally at 20 in FIG. 1, separator 20a is formed having a rectangularly shaped periphery which extends slightly but importantly beyond all electrochemically active components of the battery. Note in this regard, that the separator element extends slightly beyond the periphery of cathode current collector assembly 36. Element 20a as well as all separators within a pile structure may be constructed of and comprise a conventional battery separator material such as aqueous electrolyte permeable fibrous sheet materials, for example, fibrous and cellulosic materials, woven or nonwoven fibrous materials such as polyester, nylon, polypropylene, polyethylene or glass. A peripheral, frame shaped portion of each separator, as at 21a, is impregnated with a thermal sealing electrically insulative adhesive such as a polymeric hot melt adhesive, for example, a conventional hot melt vinyl adhesive suited to secure each separator with contiguous anode and cathode carrier sheets, such as polymeric current collector sheet 40. Note that sealing periphery 21a is positioned well outwardly from the area of influence of electrolyte gell 50a. Following appropriate placement of discrete separator element 20a, its peripheral portion 21a is thermally sealed to the subassembly including carrier sheet 12 and collector assembly 36, a thermally induced bond being available between sealant 21a and the noted polymeric current collector sheet 40.

As is represented at function block 54 in FIG. 3, the pile subassembly now moves to a second station for the application of electrolyte. Identified in FIG. 4 at 50b, this second electrolyte application is made over the central portion of separator 20a within the porous area thereof not incorporating sealant 21a. With this electrolyte application, a continuous electrolytic association between the cathode 42a and a next adjacent anode may be effected.

The associated anode for the initial cell is provided, as shown at function block 56 in FIG. 3, with the positioning over the subassembly of a discrete duplex electrode 58a. Serving as an intercell connector, duplex electrode 58a may be prefabricated of a sheet or film of electrically conducting material, preferably a sheet of electrically conductive carbon impregnated vinyl which, as described earlier, in connection with layer 40 may be "Condulon" or the like. Materials for the intercell connectors should be impervious to the electrolyte utilized within the cell structure, must provide a function for conducting electrical current between the positive electrode in one cell and the negative electrode in the next cell, should not create undesired electrochemical reactions with the electrodes or other components of the battery and should be heat sealable. Preformed centrally upon the lowermost side of the conductive sheet is a distribution of active zinc negative or anode material 60a which, in conventional fashion, is amalgamated with, for instance, mercury by contact with mercuric chloride within the electrolyte of the cell. Oppositely disposed upon the conductive sheet of the duplex intercell connector 58a is another dry deposition of active positive material 42b which is present, for instance, as a manganese dioxide/electrically conductive carbon mixture dispersed in a polymeric binder as described earlier. The electrically conductive sheet forming the duplex electrode 58a is configured in discrete fashion having a peripheral dimension corresponding with that of cathode current collector assembly 36. As such, it may be observed in FIG. 4 that separator 21a will extend beyond the periphery of electrode 58a. Following its positioning, the duplex electrode sheet is heat sealed about its outer periphery to the sealant 21a of earlier positioned separator 20a. As a consequence, the first electrochemically active cell of the pile structure will have been assembled. Note at this juncture, that the active cell is carried by an electrically insulative and chemically inert carrier web 12 in spaced relationship and separated from other multicell components such that no backing voltages or the like will commence to be created along the production or assembly line.

As is revealed at function block 62 in FIG. 3, the unit cell subassembly is moved by carrier 12 to a station applying electrolyte as identified in FIG. 4 at 50c. This deposition in combination with cathode material 42b commences the build-up of the next serially coupled contiguous cell. Accordingly, the above-described sequence of construction may be reiterated as shown at block 64 of FIG. 3 by select repetition of the series of station procedures employed in connection with blocks 52, 55, 56, and 62. Note in this regard that these blocks, respectively, have been labeled "A", "B", "C", and "D", and identified in that sequence in block 64. In each reiteration the dimensional configurations of the discrete elements remain identical as well as their positioning in registration to achieve a requisite laminar structure. Turning to FIG. 4, note that a four cell pile structure is illustrated as including separators 20a–20d, electrolyte depositions 50a–50h, duplex intercell connector elements 58a–58c, cathode electrode depositions 42a–42b, and anode depositions 60a–60d.

Following the final electrolyte deposition 50h (FIG. 4), the multicell subassembly is moved by web 12 to a station applying a discrete anode current collector assembly as shown in FIG. 3 at block 66. Identified earlier at 14 in FIG. 1, and illustrated in more detail in FIGS. 2 and 4, assembly 14 is configured in similar laminar fashion as earlier described assembly 36. In this regard, assembly 14 is constructed having a metallic sheet terminal surface portion preferably formed of annealed tin coated steel sheet material on the order of less than 10 mils in thickness, as shown at 68, in laminar electrical and physical bond with a polymeric current collector sheet of electrically conductive carbon impregnated vinyl film 70. Sheets 68 and 70 are coextensive in dimension, however, such dimension is extended, as previously described at 16, to a widthwise dimension protruding beyond the adjacent edge of carrier web 12. Centered within that portion of assembly 14 excluding extension 16 is active zinc negative material 60d predeposited thereupon in similar fashion as provided at anode deposits 60a–60c. Upon being positioned as shown in FIG. 2, the multicell pile subassembly is moved into a final sealing area defined by function block 72. Within this area, the peripheries of the discrete components of the multicell assembly are subjected to a series of heat-pressure sealing operations to assure the integrity of all peripheral seals within the assembly. Through the use of multiple stage sealing, excessive heat built-up is avoided which otherwise may adversely effect the operative quality of the electrolyte depositions within a battery. It should be understood that each sealing step throughout the above-described assembly procedure preferably is carried out as a separate step in conjunction with the incremental advancement of cell subassemblies upon carrier web 12.

As revealed at block 74 in FIG. 3, following final sealing, the extension 16 of anode collector assembly 14 is folded around the edge of the multicell assembly to a position wherein surface 70 thereof abuts against the underside of web 12. As described in connection with FIG. 1, this exposes the metallic surface 68 of assembly 14 to the underside of the battery in juxtaposition to the metallic surface 38 of collector assembly 36. A select portion of the surface of metallic layer 38 is accessed through rectangular access opening 18 initially formed in web 12. The terminals of the multicell battery 10, therefore, are on one side of the battery and in conveniently spaced juxtaposition.

Looking to FIG. 4, it may be observed that no additional insulative materials are required to accommodate for the noted folding of extension 16 inasmuch as separator peripheries 21a–21d extend beyond intercell connectors 58a–58c, while the complementing peripheral edge and exposed surface of electrically insulating carrier web 12 provides insulative protection of collector assembly 36. Accordingly, the structure is simply formed, retaining a high reliability through the geometry of its component discrete elements. Web 12 then carries the battery assemblies 10 to a shearing station depicted in FIG. 3 at 76. At this point, electrically insulative web 12 is sheared to provide discrete battery units such as that shown in FIG. 1. As noted earlier, no electrical interconnection is formed between the web-connected multiplicity of subassemblies, therefore, no voltage build-up phenomena is witnessed. Further, no electrically conductive material, for instance, the polymeric electrically conductive materials and metal foils are cut or sheared within an electrochemical environment on the production line. Only the electrically insulative carrier 12 in sheared. As a consequence, edge shorting occasioned during the formation of discrete elements is substantially eliminated.

Figure 5:
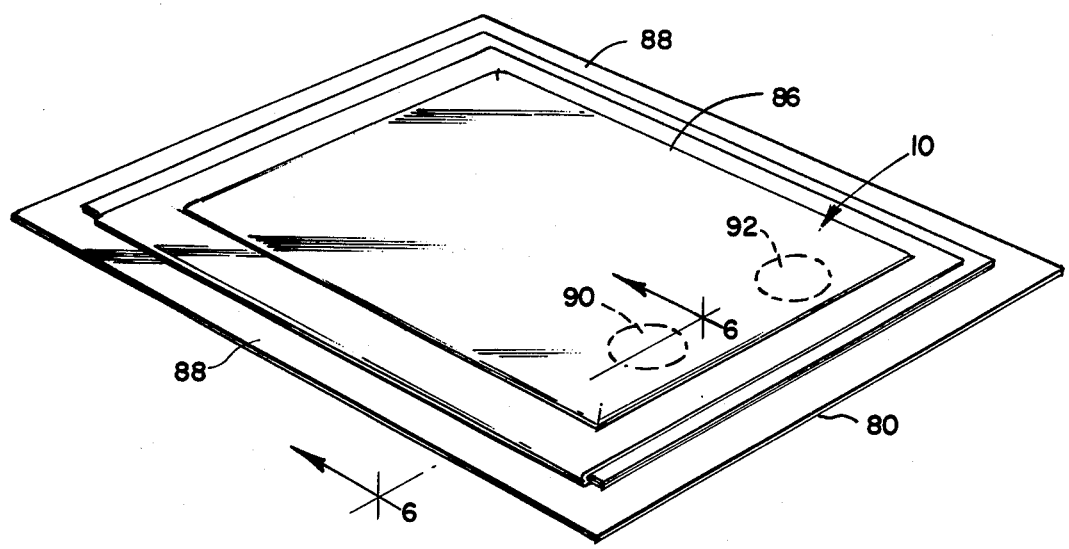
FIG. 5 is a pictorial view of the battery structure of the invention showing it following a final packaging thereof.
Figure 6:
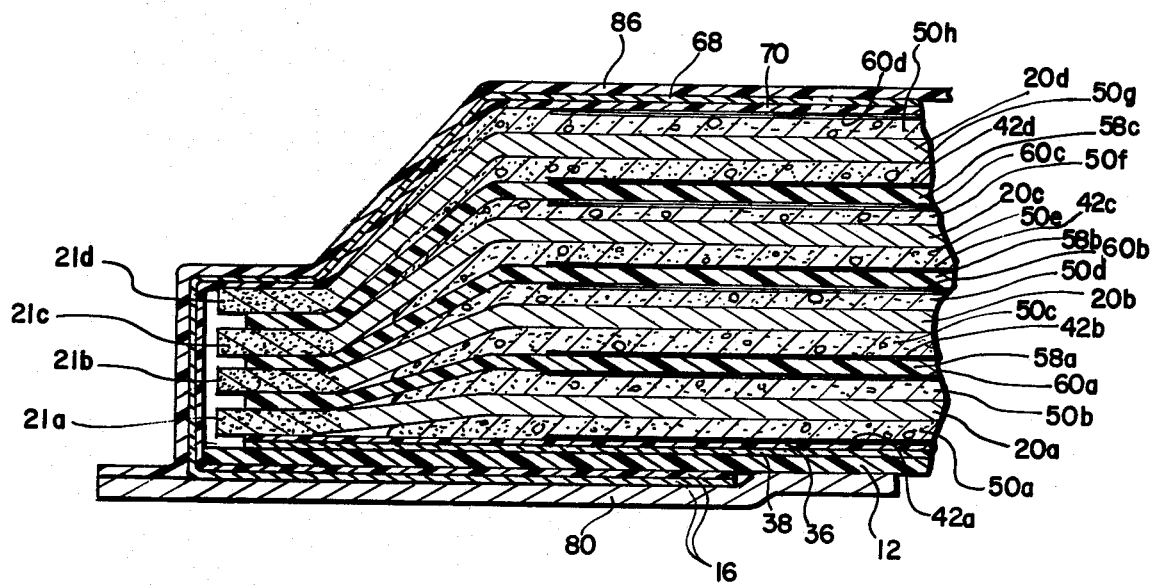
FIG. 6 is a sectional view of the structure of FIG. 5 taken through the plane 6—6 thereof.

Following shearing of web 12, the discrete battery units 10 are positioned upon a continuous carrier roll of cardboard stock 80 shown extending from a supply roll 82 in FIG. 3. Stock 80 is provided having a widthwise dimension greater than that of the completed battery assembly 10 and an upward facing surface having formed thereon a low temperature heat sealing material upon which battery assemblies 10 are positioned. As depicted generally at function block 84, final packaging of the battery units 10 may then take place upon this insulated carrier 80. In one such packaging arrangement, the forward edge of battery elements 10 is heat sealed to the adhesive coating of card stock 80 at the forward edge thereof through the use of a simple hot bar technique. The thus attached battery units are then moved by the continuous web card stock through a station wherein a thin electrically insulative film having a heat sealable coating, also electrically insulating, is positioned over the card stock-battery combination in continuous fashion. This overwrap is depicted in FIG. 5 at 86. Upon positioning of overwrap 86, the peripheral portion 88 of card stock 80 is sealed to overwrap 86 utilizing a heat sealing technique following which the card stock 80, carrying the individual battery components 10, is sheared to provide discrete packaged battery units. A finally packaged battery is shown in cross-section in FIG. 6.

Returning to FIG. 5, two access apertures 90 and 92 are shown formed in appropriate position within card stock 80. Having a round configuration, apertures 90 and 92, respectively, provide access to the outwardly facing metallic surfaces provided by wrap-around portion 16 of collector assembly 14 and surface 38 of collector assembly 36 as accessed from opening 18.

Since certain changes may be made in the above product and method without departing from the scope of the invention herein involved, it is intended that all matter contained in the above description or shown in the accompanying drawings shall be interpreted as illustrative and not in a limiting sense.

What is claimed is:

1. A method for constructing flat battery units comprising the steps of:
    providing first current collectors, each having a lengthwise and widthwise dimension;
    providing a continuous carrier sheet of electrically insulative material having a widthwise dimension at least as great as the widthwise dimension of said first current collectors;
    intermittently depositing in predetermined spaced sequential alignment upon one side of said continuous carrier sheet said first current collectors; thereon depositing in a predetermined sequence superposed on each first current collector electrolyte, anode materials, cathode materials, separators and intercell connectors; and thereon depositing a second current collector to form discrete electrically coupled flat cell assemblies; and cutting said continuous carrier sheet between said discrete cell assemblies to provide discrete battery units comprising a sheet of electrically insulative material at least coextensive in size with a first current collector.

2. The method for constructing flat battery units of claim 1 in which said continuous carrier sheet is provided having a widthwise dimension substantially corresponding with the width of an ultimate flat battery unit.

3. The method for constructing flat battery units of claim 1 including the step of providing access openings within said continuous carrier sheet to expose the surface of each said first current collector thereby defining a first terminal surface for each said constructed discrete flat battery units.

4. The method for constructing flat battery units of claim 3 wherein said access openings are provided at a predetermined repetitive spacing along said carrier sheet.

5. The method for constructing flat battery units of claim 4 wherein the second current collector has a widthwise dimension greater than the width of said carrier sheet and extending beyond a width defining edge thereof.

6. The method for constructing flat battery units of claim 5 which includes the step of folding the portion of said second current collector extending beyond said carrier sheet over and in juxtaposition against said carrier sheet to define a second terminal surface of said flat battery unit on the same side of said battery as said first terminal.

7. The method for constructing flat battery units of claim 6 including the step of packaging said battery units in a manner exposing portions of said first and second terminals.

8. A method for constructing flat multicell batteries comprising the steps of:

providing a continuous carrier sheet of electrically insulative material having intermittently spaced access openings;

intermittently fixedly positioning discrete first current collectors in predetermined spaced sequential relationship directly upon one side of said continuous carrier sheet, each of said first current collectors being spaced coincidentally with one of said intermittent access openings in said insulative carrier sheet thereby forming a first battery terminal;

forming a predetermined number of cells upon each said collector, said cells including intercell connectors, and cathode and anode electrodes between which is disposed electrolyte and separator means;

positioning discrete second collector assemblies over and in electrochemical association with the uppermost of said cells to form a multicell unit, said second collector assemblies having a width selectively extending beyond the edge of said continuous carrier sheet;

folding said width of said second collector assembly extending beyond said carrier sheet about the edge thereof to a position juxtaposed against a surface thereof, thereby forming a second battery terminal on the same side of said battery as said first terminal; and sealing the periphery of each said multicell unit.

9. The method for constructing flat multicell batteries of claim 8 in which said continuous carrier sheet is provided having a widthwise dimension substantially corresponding with the width of a said flat battery unit.

10. The method of constructing flat multicell batteries of claim 8 including the step of:

cutting said continuous carrier sheet between said multicell units.

11. The method for constructing flat multicell batteries of claim 10 including the step of:

packaging said multicell units in a manner exposing selectively spaced and dimensioned portions of said current collector.

12. The method for constructing flat multicell batteries of claim 8 wherein said continuous carrier sheet is provided having a widthwise dimension corresponding with the width of one said battery.

13. A method for making flat multicell primary batteries comprising the steps of:

providing a discrete laminar first current collector assembly having a lengthwise and widthwise dimension;

providing a continuous carrier sheet of electrically insulative material having a widthwise dimension at least as great as the widthwise dimension of said discrete laminar first current collector;

intermittently positioning a discrete laminar first current collector assembly upon said carrier sheet, said assembly having a metallic surface positional against said carrier sheet and an oppositely disposed electrically conductive material supporting a first electrode;

positioning electrolyte, discrete separator and discrete intercell connectors carrying complementing electrode materials over said first current collector assembly to provide a multicell subassembly;

selectively intersealing said carrier sheet, said first current collector assembly, said discrete separator and said intercell connector;

positioning a discrete laminar second current assembly upon each said multicell subassembly, said second collector assembly having an electrode supporting electrically conducting material positioned in operative relationship with said multicell assembly and an outwardly facing metallic surface; and sealing the periphery of said multicell subassembly and said second collector assembly.

14. The method for making flat multicell primary batteries of claim 13 wherein said multicell subassemblies are built up upon said continuous carrier sheet in predetermined spaced relationship and, including the step of cutting said continuous carrier sheet between said discrete multicell subassemblies following the said sealing of the periphery of said multicell subassembly and said second collector assembly.

15. The method for making flat multicell primary batteries of claim 14 including the step of providing access openings within said continuous carrier sheet to expose said metallic surface of said discrete laminar first current collector assembly thereby defining a terminal surface.

16. The method for making flat multicell primary batteries of claim 13 in which said second current collector assembly is provided having a width extending beyond an edge of said carrier sheet and including the step of folding the portion of said second current collector extending beyond said carrier sheet over and in juxtaposition against said carrier sheet to define a terminal surface of said batteries.

17. The method for making flat multicell primary batteries of claim 16 including the step of packaging each said assembled primary battery in a manner exposing selectively spaced and dimensioned metallic surface portions of said first and second current collector assemblies.

* * * * *